(12) United States Patent
Artini (10) Patent No.: US 7,783,394 B2
(45) Date of Patent: Aug. 24, 2010

(54) METHOD AND DEVICE FOR CONSTRUCTING A LOW-ALTITUDE FLIGHT PLAN TO BE FOLLOWED BY AN AIRCRAFT

(75) Inventor: Franck Artini, Toulouse (FR)

(73) Assignee: Airbus, Blagnac (FR)

( * ) Notice: Subject to any disclaimer, the term of this patent is extended or adjusted under 35 U.S.C. 154(b) by 548 days.

(21) Appl. No.: 11/813,971

(22) PCT Filed: Jan. 26, 2006

(86) PCT No.: PCT/FR2006/000172
§ 371 (c)(1),
(2), (4) Date: Jul. 13, 2007

(87) PCT Pub. No.: WO2006/079718
PCT Pub. Date: Aug. 3, 2006

(65) Prior Publication Data
US 2008/0103643 A1    May 1, 2008

(30) Foreign Application Priority Data
Jan. 31, 2005    (FR) .................................. 05 00938

(51) Int. Cl.
*G05D 1/06*    (2006.01)
*G08G 5/04*    (2006.01)

(52) U.S. Cl. ................ 701/4; 701/301; 701/8; 701/14; 701/206; 701/120; 244/137; 244/195; 342/26 B; 702/5

(58) Field of Classification Search .............. 244/137.3, 244/195; 701/4, 5, 6, 221; 342/26 B
See application file for complete search history.

(56) References Cited

U.S. PATENT DOCUMENTS

| 5,706,011 A * | 1/1998 | Huss et al. ..................... 342/65 |
| 5,922,031 A * | 7/1999 | Larrieu .......................... 701/3 |
| 7,321,812 B2 * | 1/2008 | Silberman et al. .............. 701/3 |
| 2007/0150170 A1 * | 6/2007 | Deker ......................... 701/120 |
| 2007/0185652 A1 * | 8/2007 | Salmon et al. .............. 701/301 |

FOREIGN PATENT DOCUMENTS

| EP | 0775953 | 5/1997 |
| WO | 2005069094 | 7/2005 |

OTHER PUBLICATIONS

PCT International Search Report dated Apr. 27, 2006.

* cited by examiner

*Primary Examiner*—Thomas G Black
*Assistant Examiner*—Lin B Olsen
(74) *Attorney, Agent, or Firm*—Dickinson Wright PLLC (57) ABSTRACT

The invention relates to a method and a device for constructing a low-altitude flight path to be followed by an aircraft. The device comprises a database including a terrain profile concerning the terrain to be flown over by the aircraft, a set of data sources, first unit for determining a lateral trajectory of the flight path, and second unit for determining a vertical trajectory of the flight path, the second unit being formed so as to determine the vertical trajectory during the aircraft flight, successively as the flight proceeds, segment by segment, and including an element for retrieving from the database a profile section, and an element for determining a vertical trajectory segment, using the retrieved profile section, based on the climb-out and let-down performances of the aircraft derived from the set of data sources.

9 Claims, 6 Drawing Sheets

METHOD AND DEVICE FOR CONSTRUCTING A LOW-ALTITUDE FLIGHT PLAN TO BE FOLLOWED BY AN AIRCRAFT

TECHNICAL FIELD OF THE INVENTION

The present invention relates to a method and device for constructing a low-altitude flight path to be followed by an aircraft.

BACKGROUND

Within the framework of the present invention, the expression low-altitude flight trajectory is understood to mean a flight trajectory allowing an aircraft to follow as closely as possible the terrain overflown, while avoiding any risk of collision with a part of the terrain. Such a trajectory is therefore situated at a predetermined minimum terrain height, for example 500 feet (around 150 meters).

More particularly, although not exclusively, the present invention applies to a tactical military transport plane which exhibits a low thrust/weight ratio and high inertia, and whose maneuvering times are relatively slow in particular with respect to those of a lighter and swifter plane, such as a fighter for example. Moreover, for such a military transport plane, it is in general desirable for said plane not to be easily detectable.

It is known that the calculation of a low-altitude flight trajectory of the aforesaid type requires very significant computational resources for onboard computers used for this purpose.

Now, the crew of an aircraft, in particular of a military transport plane of the aforesaid type, may need to employ a low-altitude flight trajectory, in a quasi-immediate manner, under certain operational flight situations, such as a descent towards the ground in case of unforeseen threat so as to benefit from a masking by the terrain or upon the appearance of IMC ("Instrument Meteorological Conditions") conditions that are unforeseen in flight at low altitude in VMC ("Visual Meteorological Conditions") conditions requiring automatic guidance.

Since the computational resources are of course limited on an aircraft, it is generally impossible to construct a lengthy low-altitude flight trajectory within a very short time scale, of the order of a few seconds, as is required in operational flight situations such as those mentioned above.

This drawback is made more acute in respect of tactical military transport planes such as described previously, whose high inertia makes it necessary to compute the low-altitude flight trajectories, with the aid of onboard performance models (climb performance of the aircraft in particular). Such a mode of computation using performance models considerably lengthens the computation times, in particular relative to those intended for a fighter for example, whose high thrust/weight ratio renders the impact of the climb performance less critical.

SUMMARY OF THE INVENTION

The object of the present invention is to remedy these drawbacks. It relates to a method for constructing, in a particularly fast and accurate manner, a low-altitude flight trajectory to be followed by an aircraft, in particular a military transport plane, said flight trajectory comprising a lateral trajectory and a vertical trajectory and being constructed with the aid of a terrain profile (emanating from a terrain database) relating to a terrain to be overflown by the aircraft in such a way as to allow said aircraft to follow (as closely as possible) said overflown terrain.

According to the invention, said method is noteworthy in that said vertical trajectory of the flight trajectory is determined, during a flight of the aircraft, in a successive manner in tandem with the flight, doing so stretch by stretch, and in that for each stretch of vertical trajectory:
a section of profile which pertains to the terrain to be overflown according to the corresponding lateral trajectory is extracted from a terrain database containing said terrain profile; and
said stretch of vertical trajectory is determined with the aid of said profile section thus extracted, as a function of climb and descent performance of the aircraft.

Thus, by virtue of the present invention, the vertical trajectory of the flight trajectory is determined, not entirely in a single go before using it subsequently during a flight, but it is determined stretch by stretch during the flight, thereby making it possible to very rapidly employ the first stretch or stretches which may then be followed by the aircraft, while the following stretches are determined. This stepwise mode of computation is implemented, not only for the determination of the stretches of vertical trajectory, but also for the extraction of the terrain profile (in the form of profile sections), such an extraction also requiring in a standard fashion very significant computational resources.

Consequently, the present invention takes account of the fact that if a flight trajectory is to be computed over a long distance, it is not necessary for the complete trajectory to be available immediately at the start of the flight, but for only a certain length to be available which is able to be followed immediately by the aircraft, and which makes it possible to obtain a suitable response time and a minimum safety and anticipation level.

The present invention is particularly well suited to the following type of trajectory:
the vertical trajectory consists of constant-slope segments flown at a given preset speed;
the slope of each climb or descent segment is bounded by the maximum climb or descent performance of the aircraft, determined on the basis of an onboard performance model;
the slope of each segment is thereafter optimized as a function of the terrain profile; and
the computation is done in such a way that the trajectory is the lowest trajectory making it possible to cross the highest summit over the stretch considered.

Advantageously, to determine said vertical trajectory, a transition trajectory between, each time, two successive stretches of vertical trajectory is moreover determined, said transition trajectory making it possible to fly from one stretch to the other stretch. Said transition trajectory is preferably determined by extending the stretch, which is situated highest at a plane of transition of the two successive stretches of vertical trajectory, towards the other stretch, doing so until joining.

Furthermore, advantageously, a check is made beforehand to verify whether each profile section extracted from said database is compatible with maximum rise performance of the aircraft, and when an incompatibility is detected, the corresponding profile section is corrected so as to remove this incompatibility, the profile section thus corrected being used to determine the corresponding stretch of vertical trajectory.

Thus, it is possible, in most operational cases, to anticipate any critical terrain configuration which could be encountered at the end of the computation of each stretch of trajectory. More precisely, information is available, before the determination of each stretch, relating to the possibility of flying over the following stretch as a function of the corresponding profile section, and in the case where it is necessary to anticipate a climb, this situation is taken into account by the corrected profile section.

Additionally, advantageously, said lateral trajectory:
either complies with a flight plan provided by a pilot of the aircraft;
or is determined (automatically) by an auto-router of the aircraft.

The present invention also relates to a device for constructing, in a particularly rapid and accurate manner, a low-altitude flight trajectory to be followed by an aircraft, in particular a military transport plane, said flight trajectory comprising a lateral trajectory and a vertical trajectory.

According to the invention, said device of the type comprising:
a database containing a terrain profile pertaining to a terrain to be overflown by the aircraft;
a set of information sources, able to produce at least information pertaining to the aircraft;
a first means for determining said lateral trajectory of the flight trajectory; and
a second means for determining said vertical trajectory of the flight trajectory, is noteworthy in that said second means is formed in such a way as to determine said vertical trajectory, during a flight of the aircraft, in a successive manner in tandem with the flight, doing so stretch by stretch, and in that said second means comprises at least:
a first element for extracting from said database, at least one profile section which pertains to the terrain to be overflown according to the corresponding lateral trajectory; and
a second element for determining a stretch of vertical trajectory, with the aid of said profile section extracted by said first element, as a function of climb and descent performance of the aircraft emanating from said set of information sources.

The device in accordance with the invention therefore makes it possible to optimize the computational performance of the various computational means used during the construction of a low-altitude flight trajectory, and in particular of said second means intended for determining the vertical trajectory.

In a particular embodiment, said second means furthermore comprises a third element for determining a trajectory of transition between two successive stretches of vertical trajectory, said transition trajectory making it possible to fly from one stretch to the other stretch.

Furthermore, advantageously, said second means furthermore comprises:
a fourth element for verifying whether each profile section which is extracted by said first element is compatible with maximum climb performance of the aircraft; and
a fifth element for correcting each profile section, for which an incompatibility is detected by said fourth element, each profile section thus corrected being used by said second element to determine the corresponding stretch of vertical trajectory.

Additionally, advantageously, said set of information sources comprises at least one database containing information pertaining to climb and descent performance of the aircraft.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
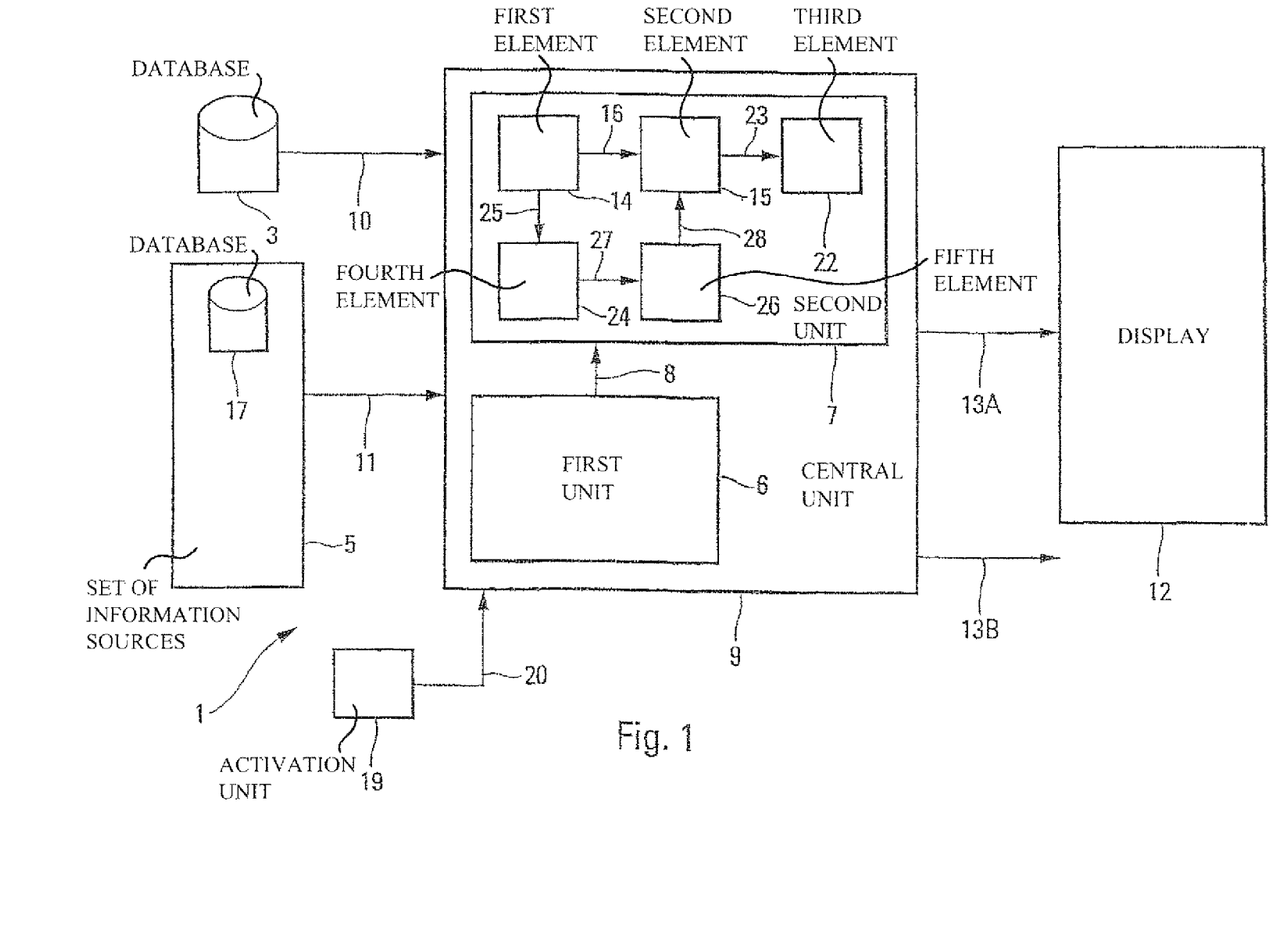
FIG. 1 is the schematic diagram of a device in accordance with the invention.

The device 1 in accordance with the invention and represented diagrammatically in FIG. 1 is aimed at the construction of a low-altitude flight trajectory TO to be followed by an aircraft A, in particular a military transport plane. Said flight trajectory TO comprises a lateral trajectory TL (not represented) which is defined in a horizontal plane and a vertical trajectory TV (or flight profile) which is defined in a vertical plane and represented in FIGS. 2 to 6.

Said flight trajectory TO is a low-altitude flight trajectory making it possible for the aircraft A to follow as closely as possible the terrain 2 overflown.

To do this, said device 1 which is onboard the aircraft A is of the type comprising:
a database 3 containing a terrain profile PT pertaining to the terrain 2 to be overflown by the aircraft A, whose relief 4 is represented partially in FIGS. 2 to 6. In the examples represented in these FIGS. 2 to 6, the terrain profile PT is situated at a predetermined minimum guard height H above said relief 4. Said database 3 may be:
a digital database, loaded before the flight into the aircraft A and containing said terrain profile PT, or
a database devised in flight by a device such as a radar in cartographic mode for example, which determines said terrain profile PT aboard the aircraft A;
a set 5 of information sources, able to produce information pertaining to the aircraft A, as specified hereinbelow;
a means 6 for constructing said lateral trajectory TL of the flight trajectory TO; and
a means 7 for constructing said vertical trajectory TV of the flight trajectory TO.

Said means 6 (a data input means or an auto-router for example) is such that said lateral trajectory TL:
either complies with a flight plan input by a pilot of the aircraft A;
or is determined (automatically) by an auto-router of the aircraft A.

In a particular embodiment, represented in FIG. 1,
said means 6 is connected by a link 8 to said means 7;
said means 6 and 7 are grouped together into a central unit 9 which is connected by links 10 and 11 respectively to the database 3 and to the set 5 of information sources; and
the device 1 comprises, moreover, a means of display 12 which is connected by a link 13A to the central unit 9 and which is able to present a pilot of the aircraft A with the results of the processing performed by said central unit 9. This in particular allows the pilot to verify visually whether the results of the computation of the vertical trajectory TV are not absurd in regard to said terrain profile PT. These results may also be transmitted to other user devices (not represented), and in particular to a standard guidance system of the aircraft A, by way of a link 13B.

According to the invention, said means 7 is formed in such a way as to determine said vertical trajectory TV during a flight of the aircraft A. More precisely, it is formed in such a way as to determine said vertical trajectory TV in a successive manner in tandem with the flight considered, doing so stretch TRi (of vertical trajectory TV) by stretch TRi (of vertical trajectory TV). For this purpose, said means 7 comprises at least:

- an element 14 for extracting from said database 3, at least one profile section SPi which pertains to the terrain 2 to be overflown according to the corresponding lateral trajectory TL and which therefore represents a part of said terrain profile PT which is contained in said database 3; and
- an element 15 which is connected by a link 16 to said element 14, for determining a stretch TRi of vertical trajectory TV, with the aid of said profile section SPi extracted by said element 14, doing so as a function of climb and descent performance of the aircraft A, which emanates from a performance database 17 (forming part for example of said set 5 of information sources) and which is received by way of said link 11.

Thus, the means 7 of the device 1 in accordance with the invention determines the vertical trajectory TV of the flight trajectory TO, not entirely in one go before using it for a flight, but stretch TRi by stretch TRi during the flight (which uses this trajectory). The whole set of various stretches TRi thus determined, i being a variable integer which can be very high, then forms said vertical trajectory TV. This allows the pilot or guidance systems for example to very rapidly employ the first stretch or stretches TRi which can be followed by the aircraft A, after a request (illustrated by a sign 18 in FIGS. 2, 3, 5 and 6) for a construction of a low-altitude flight trajectory TO such as this, while the device 1 continues to determine in a progressive manner the following stretches. The first stretch TR1 is available at a duration t0, of the order of a few seconds, after such a request so that onwards of this moment the aircraft A can commence following the low-altitude flight trajectory TO under construction over the stretch TR1.

The duration t0 is fixed a priori as the maximum duration making it possible to have a trajectory of sufficient length to be able to commit along this trajectory. This length of trajectory added after the duration t0 dictates the computational power demands of the onboard trajectory mapping means.

This stepwise mode of computation is implemented, not only for the determination of the stretches TRi of vertical trajectory TV with the aid of the means 15, but also for the extraction of the terrain profile PT (in the form of profile sections SPi) by the means 14, such an extraction requiring in standard fashion very significant computational resources.

Thus, the device 1 in accordance with the invention makes it possible to construct in a particularly rapid and accurate manner a low-altitude flight trajectory TO. Said device 1 makes it possible in particular to remedy the drawback due to the existence of limited computational resources on an aircraft A. Of course, these computational resources must be sufficient to be able to provide a stretch TR1 of minimum length after said duration to.

By virtue of the invention, a low-altitude flight trajectory TO may be made available to the pilot and/or to a guidance system of the aircraft A in a quasi-immediate manner, this being particularly advantageous in certain operational flight situations, such as a descent towards the ground in case of unforeseen threat so as to benefit from a masking by the terrain 2 or upon the occurrence of IMC conditions not foreseen in flight at low altitude under VMC conditions requiring automatic guidance, as specified hereinabove.

The present invention is also particularly advantageous in respect of a tactical military transport plane which exhibits a low thrust/weight ratio and high inertia, for which the computation of a low-altitude flight trajectory TO requires very significant computational resources, since it must use onboard performance models (performance database 17).

The device 1 in accordance with the invention moreover comprises a means of activation 19 which is connected by a link 20 to said central unit 9 and which allows an operator to activate (that is to say to request) the generation of a flight trajectory TO.

Figure 2:
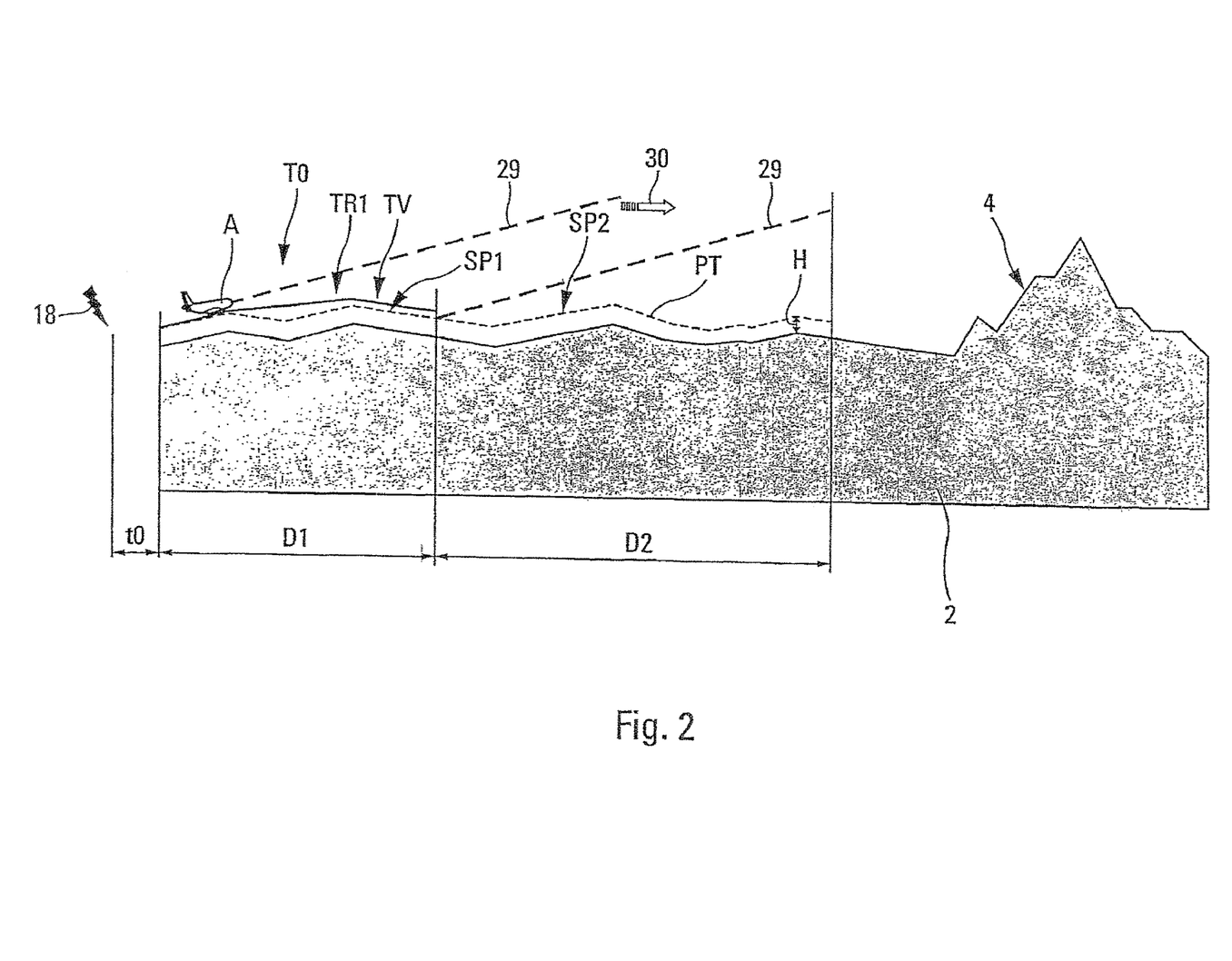
FIGS. 2 to 6 are graphics making it possible to explain the construction in accordance with the invention of a vertical trajectory of a low-altitude flight trajectory.

In FIG. 2, such an activation is depicted by the sign 18. A duration t0 after this activation, the device 1 is able to provide the first stretch TR1 of the flight trajectory which is defined over a horizontal distance D1. The aircraft A can then fly along this first stretch TR1 of flight trajectory, while the device 1 in accordance with the invention determines a second stretch TR2 which exhibits a horizontal distance D2 (FIG. 3), and so on and so forth.

It will be noted that the duration t0 is fixed a priori in the onboard device in such a way as to be compatible with the operational requirement and the configurations of the relief that must be encountered over the flight trajectory.

Said means 7 of the device 1 in accordance with the invention moreover comprises an element 22, which is connected by a link 23 to the element 15, for determining a trajectory of transition Li between two successive stretches TRi and TRi+1 of vertical trajectory TV. This transition trajectory Li makes it possible to fly from any stretch TRi to the immediately following stretch TRi+1, as represented in FIG. 4 or in FIG. 3 for the transition trajectory L1 and the stretches TR1 and TR2.

Figure 3:
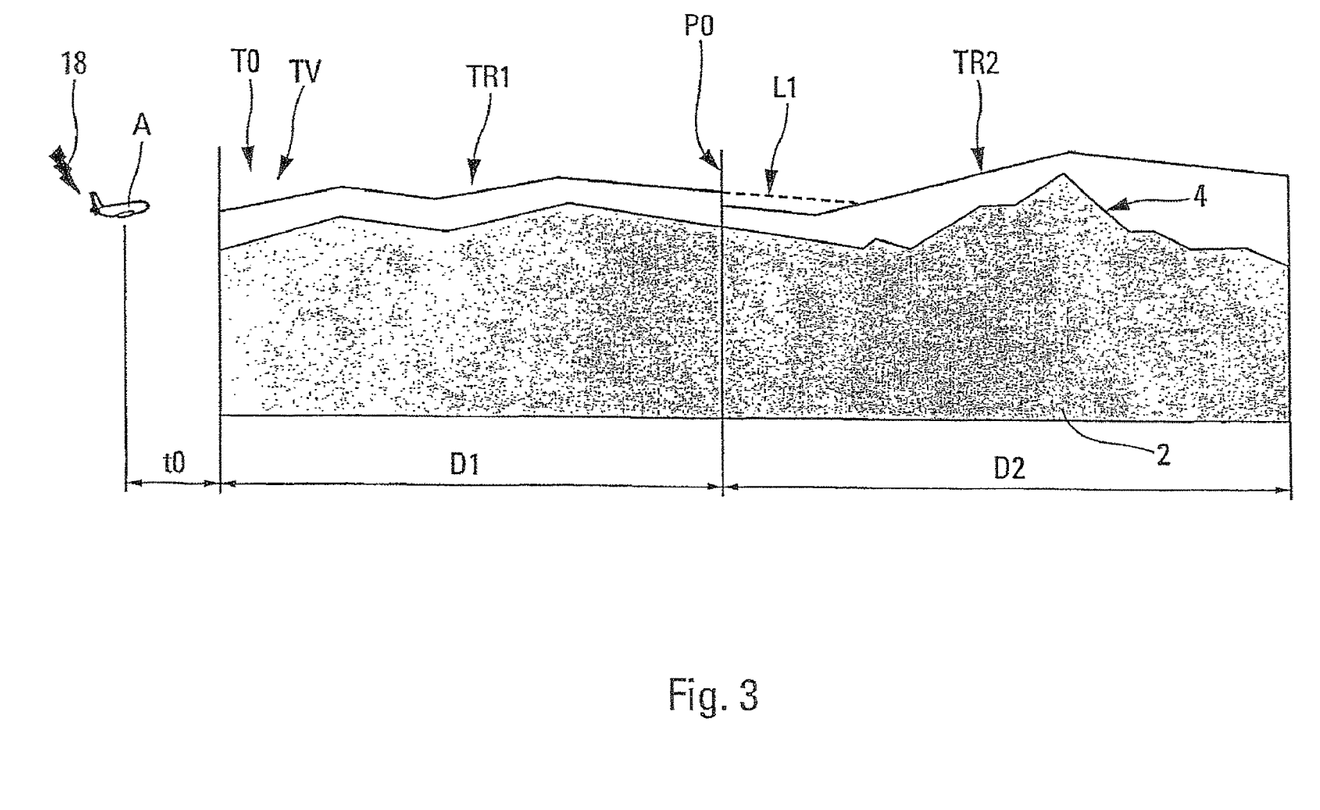
Figure 4:
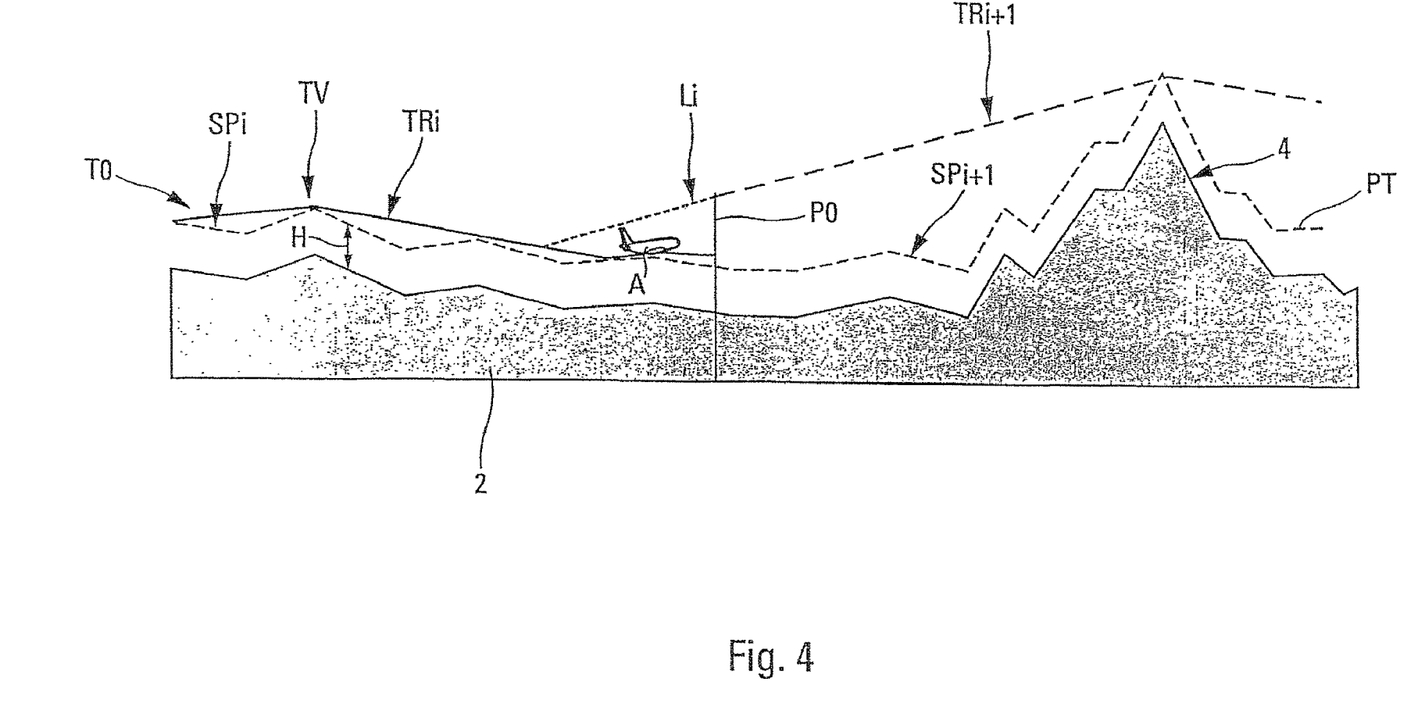

Said means 22 determines said transition trajectory Li, by extending the stretch which is situated highest at the plane of transition PO of the two successive stretches TRi and TRi+1 of trajectory. It therefore extends the stretch concerned towards the other stretch, doing so until joining with this other stretch. Thus:

- in the example of FIG. 3, the means 22 extends the stretch TR1 (upstream), since it is situated higher than the following stretch TR2, at the level of the transition plane PO; and
- in the example of FIG. 4, said means 22 extends the stretch TRi+1 (downstream), since the latter is situated higher than the previous stretch TRi, at the level of said transition plane PO.

Additionally, the means 7 of the device 1 in accordance with the invention furthermore comprises:

- an element 24 which is connected by a link 25 to the element 14 and which is intended to verify whether each profile section SPi which is extracted by this element 14 is compatible with maximum climb performance of the aircraft A, emanating from said database 17; and
- an element 26 which is connected by links 27 and 28 to said elements 24 and 15, for correcting each profile section SPi, for which an incompatibility has been detected by said element 24, doing so in the manner specified hereinbelow.

Each profile section SPi corrected by the element 26 is thereafter used by the element 15, instead of the uncorrected profile section emanating from the element 14, to determine the corresponding stretch TRi of vertical trajectory TV.

Thus, the device 1 in accordance with the invention is able to anticipate any critical terrain configuration (except for a cliff in front of the aircraft) which could be encountered at the end of the computation of each stretch TRi of vertical trajectory. More precisely, information is thus available, before the determination of each stretch TRi, relating to the possibility of flying over the following stretch TRi+1 as a function of the corresponding profile section SPi+1, and in the case where it is necessary to anticipate a climb, this situation is taken into account by the corrected profile section SPi.

To do this, said element 24 uses a guard curve 29 which is representative of the current maximum climb performance of the aircraft A. This performance is computed in standard fashion at the preset speed of the aircraft A or at the speed which gives the maximum slope if the guard curve computed at the current speed detects an impossibility of climb. In this case, the aircraft A climbs and leaves the low-altitude flight (an alarm is then signaled to the pilot).

Said guard curve 29 consists of a climb segment which rests on the terrain profile considered. This guard curve 29 then sweeps the terrain profile doing so for each stretch of vertical trajectory, as illustrated by an arrow 30 in FIGS. 2 and 5. The sweep commences (ahead of the aircraft) at the start of the first profile section SP1 which is extracted to construct the first stretch TR1 of vertical trajectory TV. This climb segment 29 must not intercept the terrain profile, at the level of the stretch of vertical trajectory considered or at the level of the following stretch (if the corresponding terrain profile is already extracted).

According to the invention, the computation of a stretch TRi of vertical trajectory starts from the highest summit over the section considered (of respective distance D1, D2, D3 in FIGS. 5 and 6) in such a way as to guarantee the passing of this summit.

Moreover, according to the invention, one is assured as rapidly as possible that a stretch is flyable. It must therefore be done before computing the vertical trajectory corresponding to this stretch of terrain. As the computation of this trajectory is an optimized computation, it takes time. Hence before this, the terrain profile is swept with the guard curve 29 which represents the maximum climb performance. As the climb may then be anticipated, the sweep commences from the current position of the aircraft A.

Figure 5:
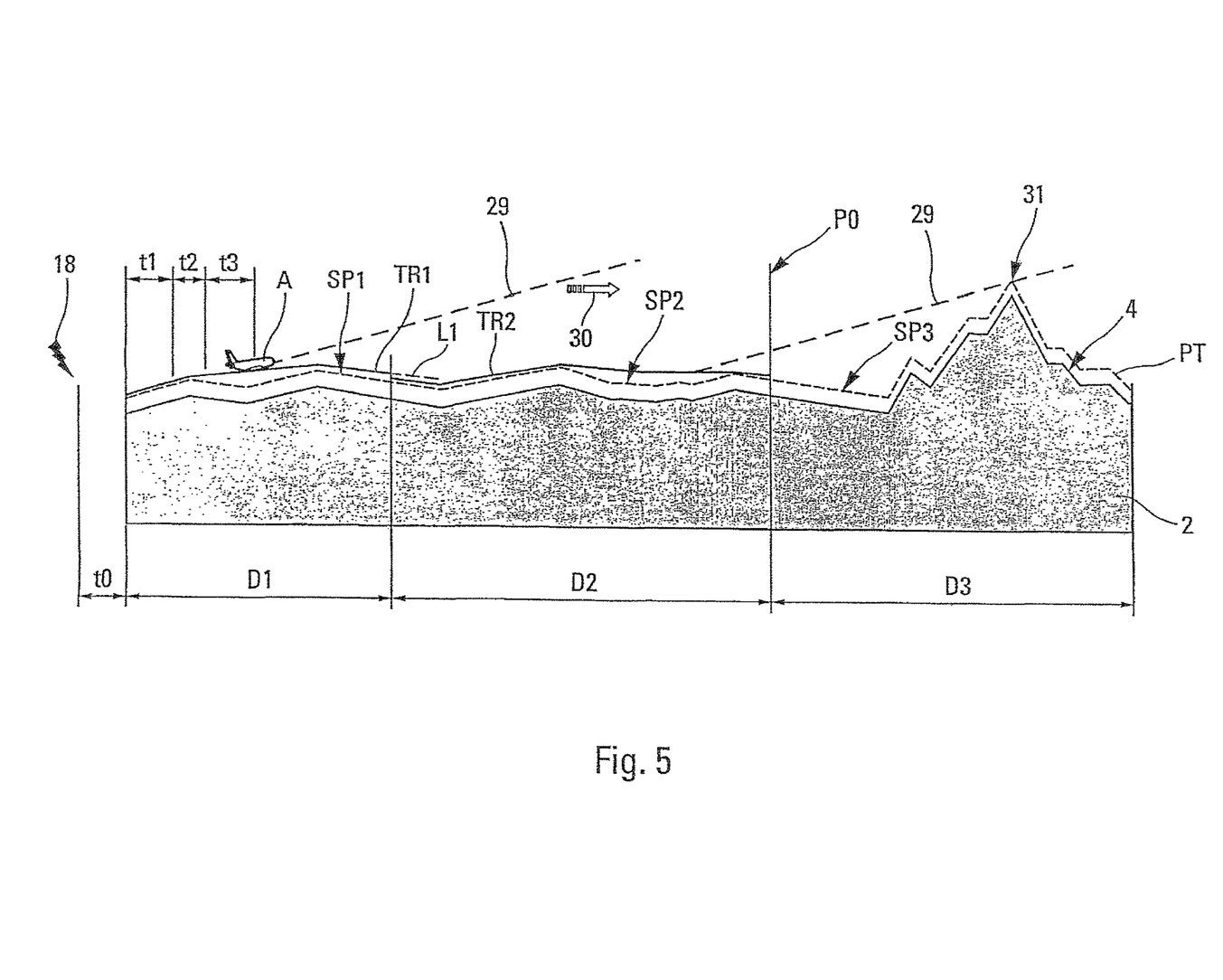
Figure 6:
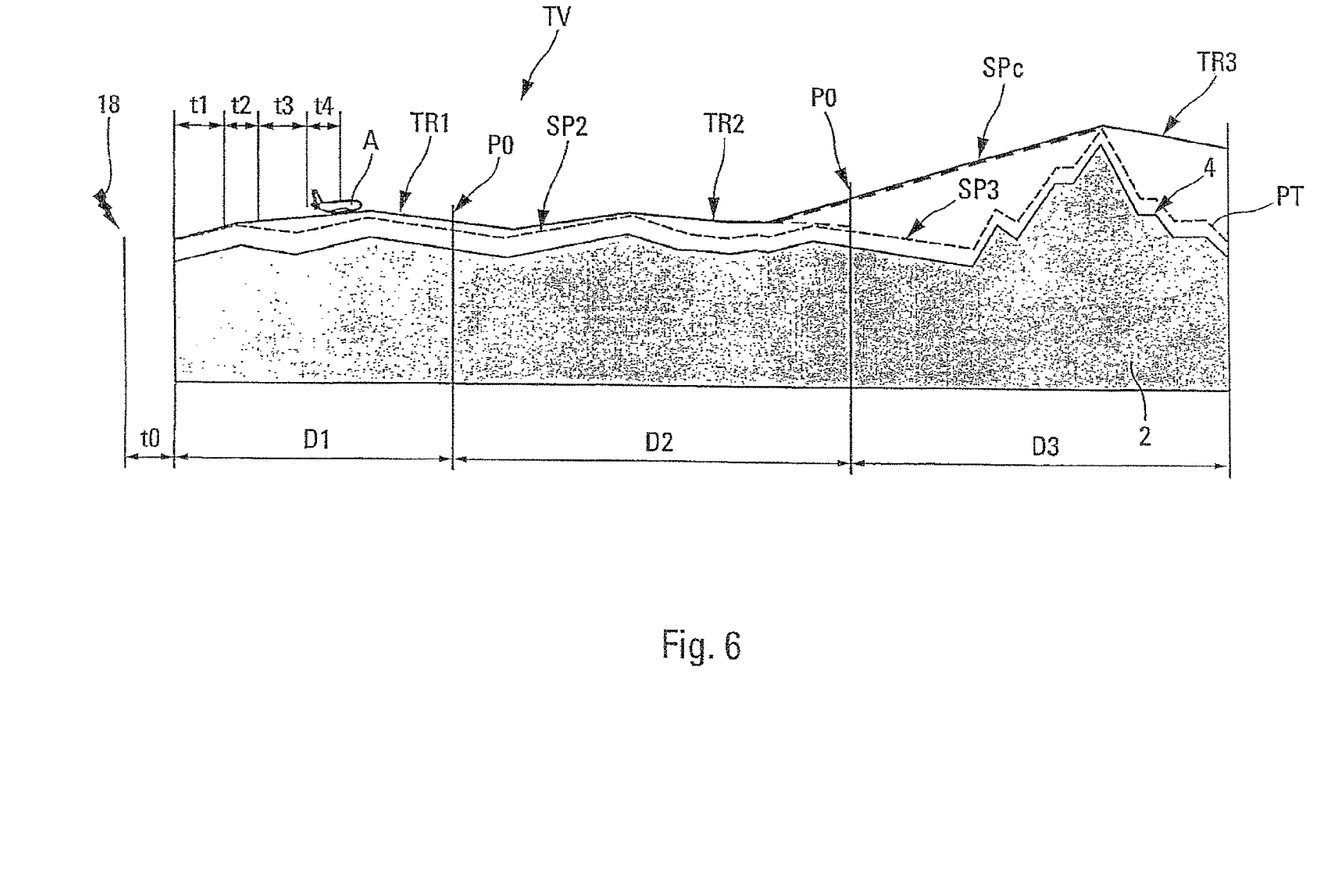

In the example of FIG. 5, after the extraction of the profile section SP3, the guard curve 29 intercepts the following profile section SP3 at a point 31. This situation makes it necessary to correct in part the profile sections SP2 and SP3, and to replace them with a corrected profile section SPc, as represented in FIG. 6. The corresponding vertical trajectory TV will then be constructed from this corrected profile section SPc.

In the example of FIG. 6:
the duration t1 corresponds to the duration of extraction of the profile section SP2 (since the aircraft A is already on the stretch TR1);
the duration t2 corresponds to the duration of computation of the stretch TR2;
the duration t3 corresponds to the duration of extraction of the profile section SP3; and
the duration t4 corresponds to the duration of computation of the stretch TR3.

The invention claimed is:

1. A method for constructing a low-altitude flight trajectory to be followed by an aircraft, said flight trajectory including a lateral trajectory and a vertical trajectory, comprising:
determining said vertical trajectory with aid of a terrain profile relating to a terrain to be overflown by the aircraft to allow said aircraft to follow said terrain, to be overflown;
determining said vertical trajectory of the flight trajectory during a flight of the aircraft, in a successive manner in tandem with the flight, doing so stretch by stretch, and for each stretch of vertical trajectory:
extracting a profile section which pertains to the terrain to be overflown according to the corresponding lateral trajectory from a terrain database including said terrain profile; and
determining said stretch of vertical trajectory with the aid of said profile section thus extracted, as a function of climb and descent performance of the aircraft,
wherein, to determine said vertical trajectory, a transition trajectory between, each time, two successive stretches of vertical trajectory is moreover determined, said transition trajectory making it possible to fly from one stretch to the other stretch, and
wherein said transition trajectory is determined by extending the stretch, which is situated highest at a plane of transition of the two successive stretches of vertical trajectory, towards the other stretch, doing so until joining with the latter.

2. The method as claimed in claim 1, wherein a check is made to verify whether each profile section extracted from said database is compatible with maximum rise performance of the aircraft, and when an incompatibility is detected, the corresponding profile section is corrected so as to remove this incompatibility, the profile section thus corrected being used to determine the corresponding stretch of vertical trajectory.

3. The method as claimed in claim 1, wherein said lateral trajectory complies with a flight plan provided by a pilot of the aircraft.

4. The method as claimed in claim 1, wherein said lateral trajectory is determined by an autorouter of the aircraft.

5. An aircraft comprising a device to implement the method specified under claim 1.

6. A device for constructing a low-altitude flight trajectory to be followed by an aircraft, said flight trajectory comprising a lateral trajectory and a vertical trajectory, said device comprising:
a database including a terrain profile pertaining to a terrain to be overflown by the aircraft
a set of information sources, able to produce at least information pertaining to the aircraft;
a first unit to determine said lateral trajectory of the flight trajectory; and
a second unit to determine said vertical trajectory of the flight trajectory, wherein said second unit is formed to determine said vertical trajectory, during a flight of the aircraft, in a successive manner in tandem with the flight, doing so stretch by stretch, and said second unit comprises at least:
a first element for extracting from said database, at least one profile section which pertains to the terrain to be overflown according to the corresponding lateral trajectory; and
a second element for determining a stretch of vertical trajectory, with the aid of said profile section extracted by said first element, as a function of climb and descent performance of the aircraft emanating from said set of information sources,
wherein said second unit comprises a third element for determining a trajectory of transition between two successive stretches of vertical trajectory, said trajectory of transition making it possible to fly from one stretch to the other stretch, and
wherein said transition trajectory is determined by extending the stretch, which is situated highest at a plane of transition of the two successive stretches of vertical trajectory, towards the other stretch, doing so until joining with the latter.

7. The device as claimed claim 6, wherein said second unit further comprises:
a fourth element to verify whether each profile section which is extracted by said first element is compatible with maximum climb performance of the aircraft; and
a fifth element to verify each profile section, for which an incompatibility is detected by said fourth element, each profile section thus corrected being used by said second element to determine the corresponding stretch of vertical trajectory.

8. The device as claimed in claim 6, wherein said set of information sources comprises at least one database including information pertaining to climb and descent performance of the aircraft.

9. An aircraft comprising a device specified under claim 6.

* * * * *